March 11, 1952     J. G. WELSH, JR     2,589,207
ANTISKID DEVICE
Filed March 5, 1948     2 SHEETS—SHEET 1
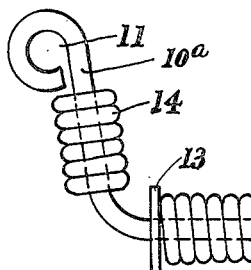
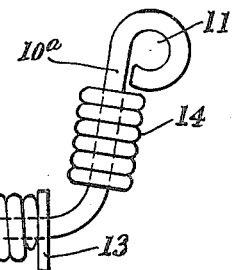
Fig. 1.
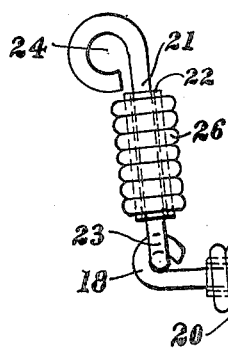
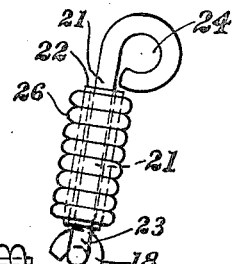
Fig. 2.
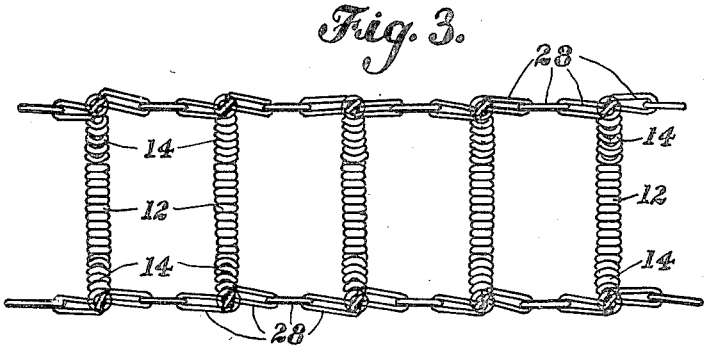
Fig. 3.
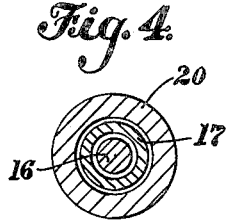
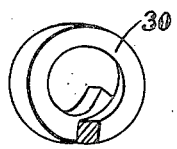
Fig. 4.     Fig. 5.
INVENTOR.
James G. Welsh, Jr.
BY Harold E. Cole
Attorney March 11, 1952  J. G. WELSH, JR  2,589,207
ANTISKID DEVICE
Filed March 5, 1948  2 SHEETS—SHEET 2
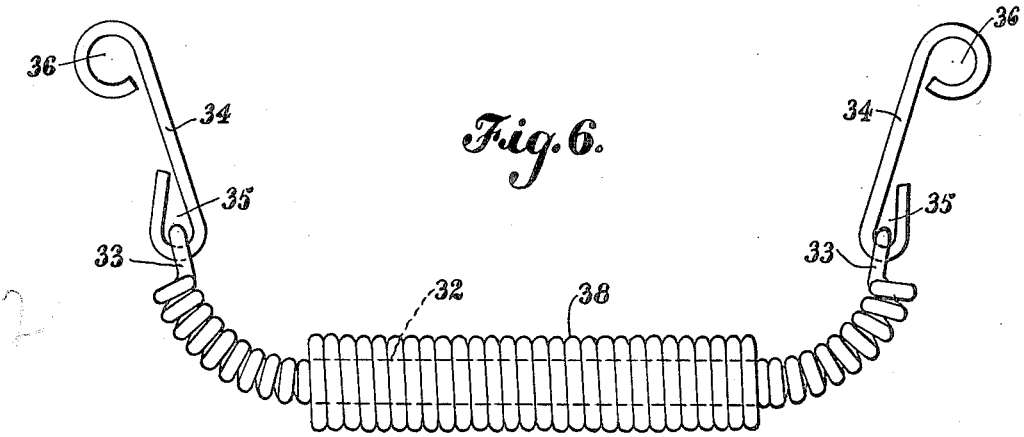
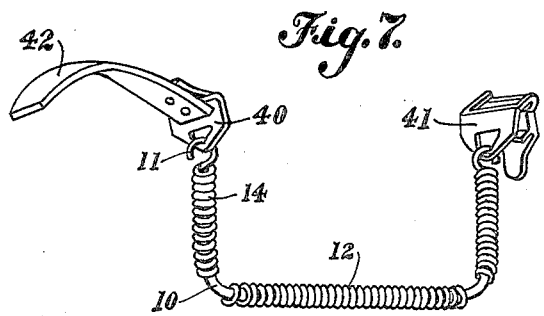  
INVENTOR.
James G. Welsh, Jr.
BY Harold E. Cole
Attorney Patented Mar. 11, 1952

2,589,207

UNITED STATES PATENT OFFICE 2,589,207

ANTISKID DEVICE

James G. Welsh, Jr., Somerville, Mass., assignor, by direct and mesne assignments, of fifteen per cent to Anthony Angelini, Torrington, Conn., and forty-five per cent to Friedrich K. Voellmecke and twenty per cent to Edward J. Doyle, both of Boston, Mass.

Application March 5, 1948, Serial No. 13,158

9 Claims. (Cl. 152—225)

This invention relates to an anti-skid or traction device for vehicle wheels, especially for automobiles.

The principal object of my invention is to provide a device that increases the traction of a tire or wheel upon ice or snow or other slippery traveling surfaces to thus prevent slipping or skidding.

Another object is to provide such a device that is very durable, yet can be produced at a relatively low cost. A further object is to provide one that provides a smoother ride than commonly used anti-skid devices.

The foregoing and other objects which will appear as the nature of the invention is better understood, may be accomplished by a construction and combination of parts such as is disclosed by the drawings and specification. The nature of the invention is such as to render it susceptible to changes and modifications, and, therefore, I am not to be limited to said disclosure; but am entitled to all such changes therefrom as fall within the scope of my claims.

In the drawings:

Figure 1 is a front elevational view of my device.

Figure 2 is a front elevational view of another form of my device.

Figure 3 is a top plan view showing a plurality of my devices connected by chains.

Figure 4 is a sectional view taken on the line 4—4 of Figure 2.

Figure 5 is a perspective view showing a spring convolution square in cross section, which type may be used in my device.

Figure 6 is a front elevational view of a modified form of my device.

Figure 7 is a front elevational view of my device with fastening means at the end.

Figure 8 is a perspective view showing a convolution, oval in shape, for my device.

As illustrated, my device has a retaining or cross member 10, shown as a single solid rod in said Figure 1, preferably made of spring steel or other durable material. It may be one-quarter inch in diameter, for instance, although the size depends upon the weight of the vehicle, size of wheel and tire, et cetera. At opposite ends of said retaining member connecting means in the form of hollow eye portions 11 are formed. Rotatably mounted on the tread portion of said retaining member 10 is a tread member 12, which may be in the form of a length of metal coil spring that preferably is tempered or otherwise made especially durable. It is short enough to provide some lateral movement and washers 13 may be provided on said retaining member 10 at opposite ends of said tread member 12 which are helpful in keeping the tread member 12 in the desired position. Instead of coil spring material a solid sleeve could be provided.

Mounted on angularly extending ends portions 10a of said cross retaining member 10 are side friction members 14 extending upwardly which are preferably rotatably mounted on said end portions 10a, to provide side traction as when a vehicle is stuck in a rut.

In said Figure 2 a cross or retaining member 16 is shown with a sleeve 17 rotatably mounted thereon for use in some instances if freer rotation is desired. Hook end portions 18 at each end of said retaining member 16 make convenient connectors. Rotatably mounted on said cross retaining member 16, or on said sleeve 17 when one is provided, are a plurality of tread members 20 of coil spring material similar to said tread member 12 only there are a plurality of them. These are preferably loosely mounted thereon to allow for some side as well as rotative movement. By using a plurality of tread members 20, as shown, the likelihood of breakage is reduced and rotative movement is freer.

Side retaining members 21, which are shown rotatably mounted on sleeves 22 in said Figure 2, each have a hollow eye or hook portion 23 that connect with said hook end portions 18 to provide a freely movable connection. At the opposite end of each said side retainer 21 is a hollow eye or hook-shaped connecting portion 24 to which may be attached buckles, straps or links or the like, to hold my device to a vehicle wheel. Rotatably mounted on said sleeves 22 or directly on said side retaining members 21 are side friction members 26 which may be made of coil spring as shown or of non-spring material.

My devices may be attached to various links of a connecting chain 28 that extends completely around a tire as shown in said Figure 3. Also they may be used as single devices having the usual connectors members 41 with a strap 42, as shown in said Figure 7.

The coil spring wire used in said tread and side friction members may be square in cross section as shown by the convolution 30 in said Figure 5. It is advantageous in some traveled surfaces to provide corner ridges or edges, which are formed where non-circular surfaces at different angles meet, such as square, triangular or other shapes in cross section. These corner edges will penetrate a smooth, icy surface sufficiently to obtain a good traction grip therein.

In said Figure 6 the retaining member 32 is made of coil spring material having hollow eye or hook portions 33 at each end which connect with hollow eye or hook portions 35 of links 34. Said links 34 have hollow eye or hook portions 36 at their outside ends to connect with whatever members may be used to hold my device to a wheel or the like.

Rotatably mounted on said coil spring retaining member 32 is a tread member 38 which is shown of coil spring material. The ends of retaining member 32 extend beyond said tread member and since the coil spring material is flexible it can be made to conform to the shape of a tire by pulling on it.

Instead of using coil spring of round convolutions, which is the common shape, I may use oval-shaped convolutions as shown at 44 in the modification shown in said Figure 8.

While coiled wire stock of hard material such as cold, rolled steel is satisfactory, other durable material could serve the purpose. It is preferable to use stock with convolutions or wires so positioned that they will spread at their travel surface when the weight of the automobile in travel is upon them. Various sizes and kinds of material may be used to make my devices, depending upon conditions of use.

What I claim is:

1. A traction device for a vehicle wheel comprising a retaining member embodying a tread portion and opposite side portions, a tread member rotatably mounted on said retaining member, side friction members rotatably mounted on said retaining member side portions, and connecting means at the ends of said retaining member.

2. A traction device for a vehicle wheel comprising a retaining member, embodying a tread portion and opposite side portions, a coil spring tread member rotatably mounted on said retaining member, coil spring side friction members rotatably mounted on said retaining member side portions and connecting means at the ends of said retaining member side portions.

3. A traction device for a vehicle wheel comprising a retaining member embodying a tread portion, a tread member rotatably mounted on said retaining member tread portion, side retaining members connected to said retaining members, other members rotatably mounted on said side retaining members, and connecting means at the outside ends of said side retaining members.

4. A traction device for a vehicle wheel comprising a retaining member embodying a tread portion, a plurality of tread members rotatably mounted on said retaining member tread portion, side retaining members connected to said retaining member, traction members rotatably mounted on said side retaining members, and connecting means at the outside ends of said side retaining members.

5. A traction device for a vehicle wheel comprising a retaining member embodying a tread portion, side retainer portions connected thereto, a plurality of coil spring tread members rotatably mounted on the tread portion of said retaining member, coil spring friction members rotatably mounted on said retainer side portions, and connecting means at the end of said retainer side portions.

6. A traction device for a vehicle wheel comprising a retaining member embodying a tread portion and connecting portions at opposite ends having openings therein, a tread member rotatably mounted on said retaining member tread portion, side retaining members embodying connecting portions at one end having openings therein and freely interconnecting with said retaining member connecting portions, friction members rotatably mounted on said side retaining members, and connecting means at the ends of said side retaining members.

7. A traction device for a vehicle wheel comprising a retaining member embodying a tread portion and connecting portions at opposite ends having openings therein, a coil spring tread member rotatably mounted on said retaining member tread portion, side retaining members embodying connecting portions at one end having openings therein and interconnecting with said retaining member connecting portions, coil spring friction members rotatably mounted on said side retainer members and connecting means at the end of said side retaining members.

8. A traction device for a vehicle wheel comprising a retaining member embodying a tread portion, a sleeve rotatably mounted on said tread portion, a tread member rotatably mounted on said sleeve, and connecting means at the ends of said retaining member.

9. A traction device for a vehicle wheel comprising a retaining member embodying a tread portion, a plurality of tread members rotatably and slidably mounted on said tread portion, the length of said tread portion being greater than the total length of said tread members' said tread portion having sufficient space to simultaneously provide space between all said tread members and between the latter and the longitudinal end extremities of said tread portion whereby said tread members may slide and rotate simultaneously on said tread portion.

JAMES G. WELSH, JR.

REFERENCES CITED

The following references are of record in the file of this patent:

UNITED STATES PATENTS

| Number | Name | Date |
| --- | --- | --- |
| Re. 15,387 | Ratzburg | June 13, 1922 |
| 1,094,827 | Wyllys | Apr. 28, 1914 |
| 1,499,569 | Hoff | July 1, 1924 |